UNITED STATES PATENT OFFICE.

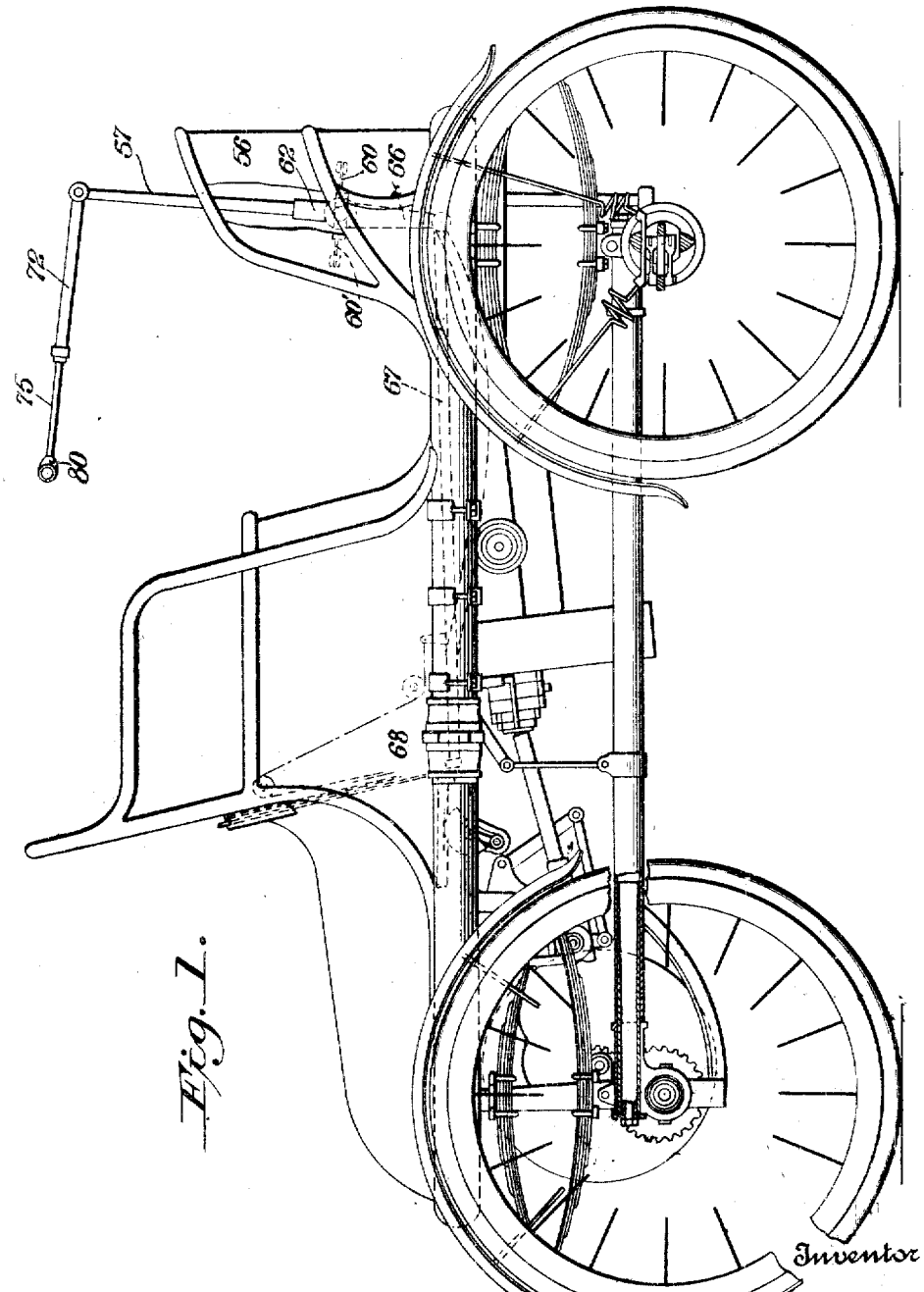

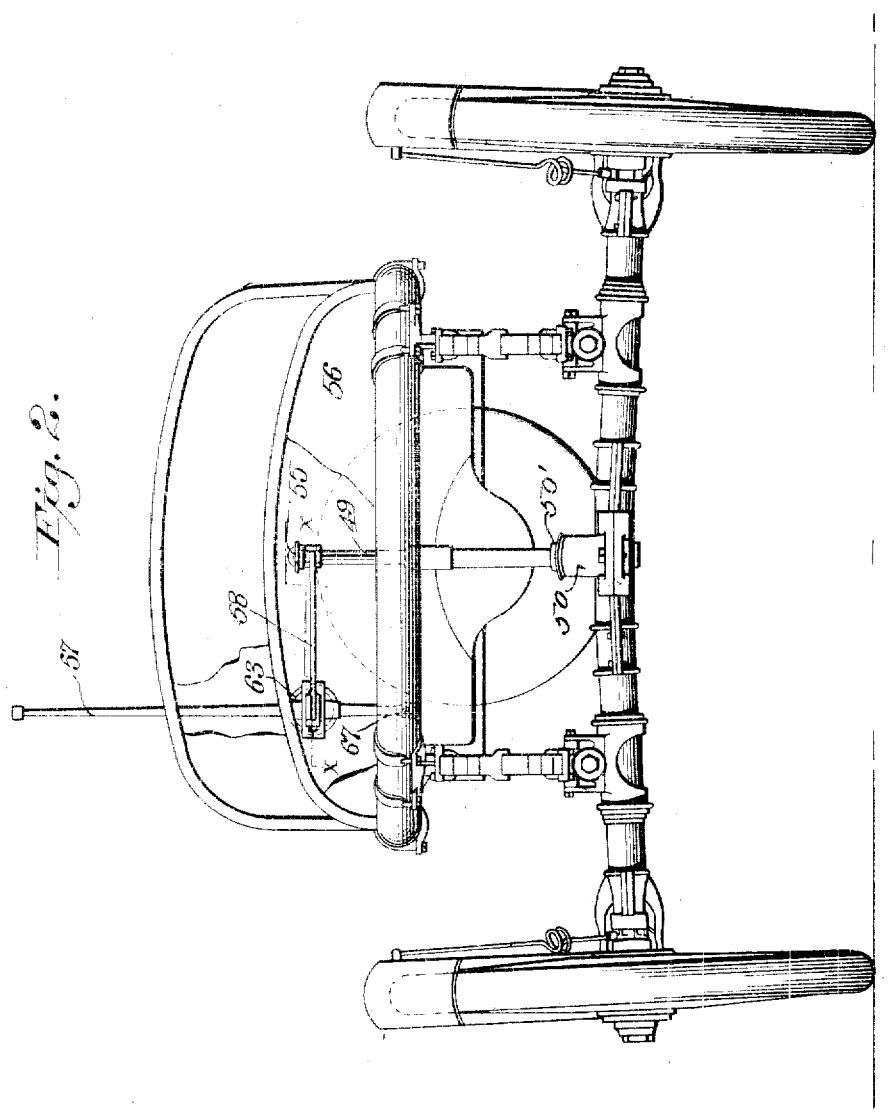

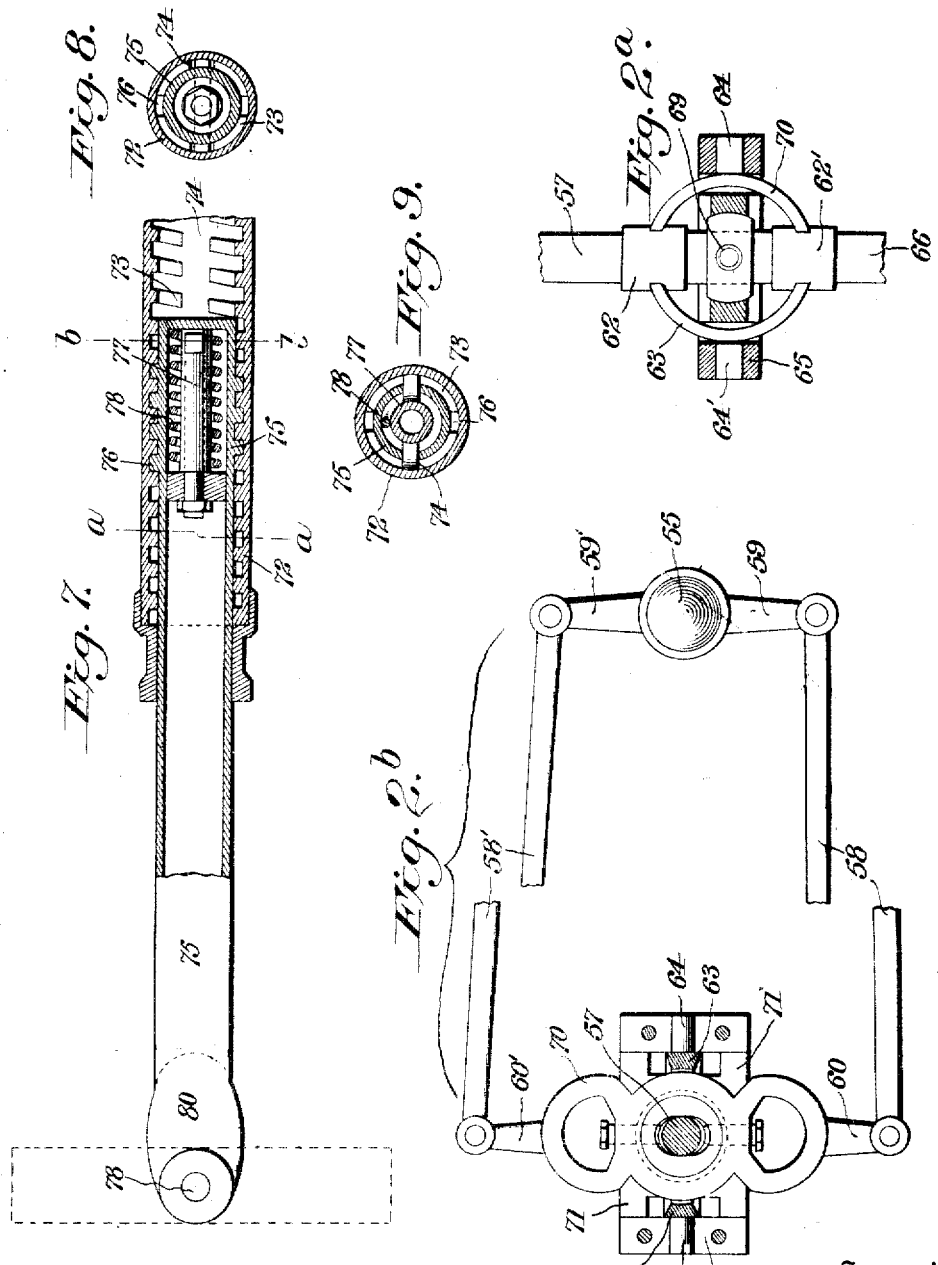

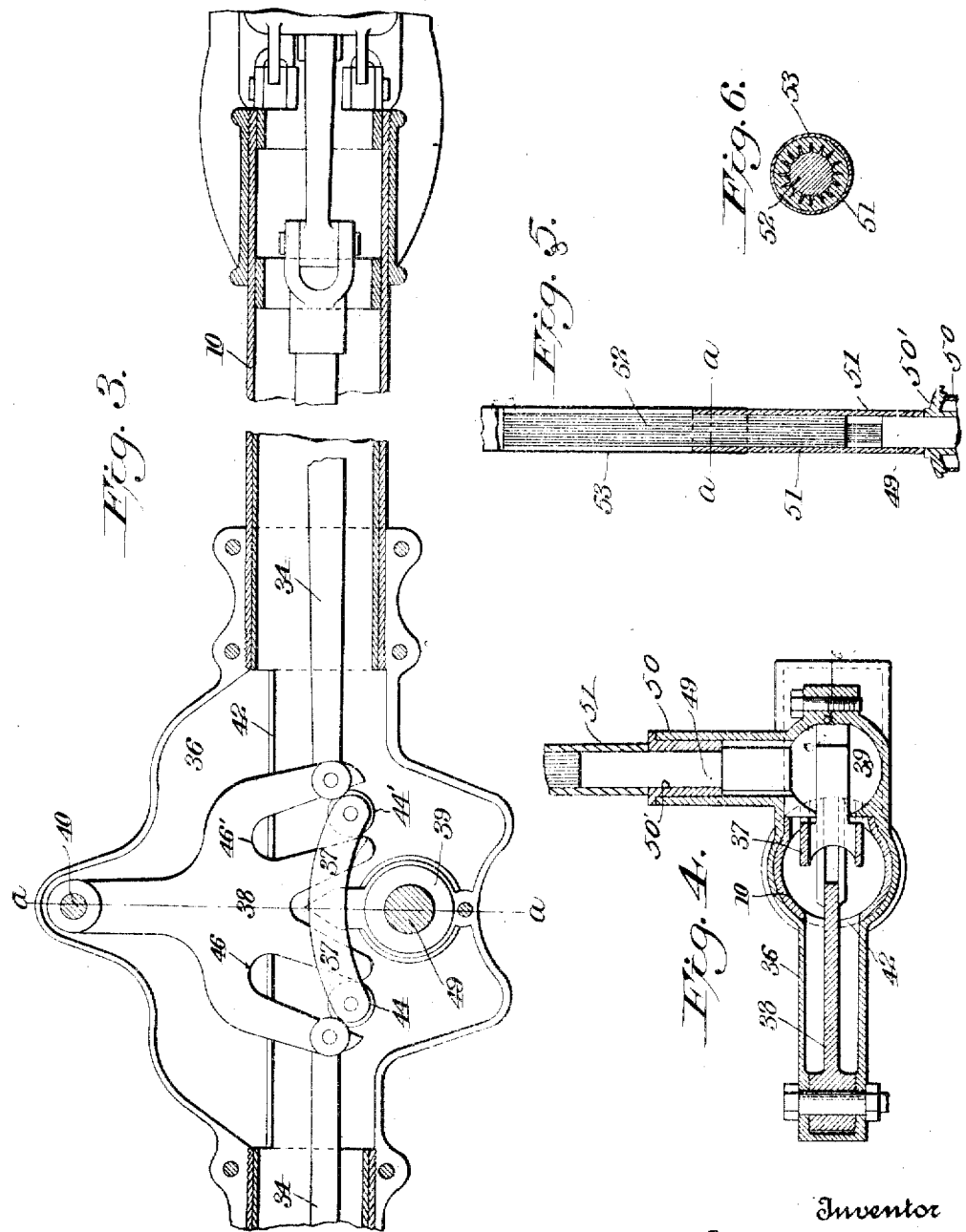

EDWARD P. COWLES, OF SPARTA, MICHIGAN, ASSIGNOR, BY MESNE ASSIGNMENTS, TO PACKARD MOTOR CAR COMPANY, OF DETROIT, MICHIGAN, A CORPORATION OF MICHIGAN.

MOTOR-VEHICLE.

1,166,440.  Specification of Letters Patent.  Patented Jan. 4, 1916.

Original application filed September 6, 1901, Serial No. 74,497. Divided and application filed August 9, 1912, Serial No. 714,297. Divided and this application filed April 8, 1914. Serial No. 830,482.

*To all whom it may concern:*

Be it known that I, EDWARD P. COWLES, a citizen of the United States, and a resident of Sparta, Kent county, State of Michigan, have invented certain new and useful Improvements in Motor-Vehicles, of which the following is a specification.

This application is a division of my application, Serial No. 714,297, filed August 9, 1912, which in turn is a division of my earlier application filed September 6, 1901, and issued January 21, 1913, Patent No. 1,050,810.

My present invention relates to improvements in motor vehicles and particularly to the steering mechanism of such vehicles.

One of the objects of the invention is to provide a steering mechanism of high precision adapted to work with extreme sensitiveness and automatically locking when the vehicle is running in proximity with a straight line.

With this and other objects in view, the invention consists in the construction and arrangement of parts described in the following specification, reference being had to the accompanying drawings, in which:

Figure 1 is a side elevation of a vehicle embodying my invention, parts being shown in section and a part broken away; Fig. 2 is a view of the front end of said vehicle, partly broken away; Fig. 2ª is a vertical section through the bearing for the steering shaft; Fig. 2ᵇ is a detail section on the line *r—r* of Fig. 2; Fig. 3 is a horizontal section through the central portion of the front axle, showing the cams for operating the rods which are attached to the steering wheels; Fig. 4 is a section on the line *a—a* of Fig. 3; Fig. 5 is a vertical sectional view through a portion of the steering shaft; Fig. 6 is a cross-section on the line *a—a* of Fig. 5; Fig. 7 is a view showing a portion of the steering lever in side elevation and longitudinal section illustrating the devices for shortening and lengthening the lever; Fig. 8 is a section on the line *a—a* of Fig. 7. Fig. 9 is a section on the line *b—b* of Fig. 7.

Like parts are identified by the same reference numerals throughout the several views.

One essential feature of an efficient motor vehicle steering mechanism is that there shall be no lost motion between the parts thereof and that the slightest movement of the steering lever shall produce a corresponding movement of the steering wheels. For this reason it is necessary that the fulcrums of the various levers have rigid metal connections and that the joints be kept free from dust to avoid wear. To gain this end I place practically all of the steering mechanism inside the front axle 10 which is a single tube of large diameter. This also has the effect of giving the front axle a more symmetrical appearance as the rods, levers, etc., usually exposed are concealed.

I have shown in Fig. 3 one form of mechanism for connecting the controlling device with the steering wheels, this mechanism comprising rods 34 which are attached to the wheel spindles, as shown in my Patent No. 1,050,810, and to a plate 38 pivotally mounted at 40. The operating devices of the steering mechanism include the plate 38 and a double cam 37 pivoted at 39 and coöperating with the plate 38. The cam 37 and plate 38 are arranged between the upper and lower halves of a dust-proof casing 36 which is firmly clamped to the axle tube 10, preferably at its center and extends forward and rearward therefrom. The axle tube 10 is provided with suitable slots 42 to permit of the passage of the parts 37, 38.

Double cam 37 is substantially of the form of a T, the central arm of which is connected to the ball 39 forming the pivotal mounting of said cam, and has suitable free plates at its end, between which are mounted rollers 44, 44'. This construction is for the purpose of allowing the arms of cam plate 38 to pass through as said plate swings on its pivot 40; and to give the pivot 39 a bearing within the casing 36. These rollers 44, 44' extend through slots or forks 46, 46' formed in cam plate 38. Rollers 44, 44', are preferably placed so that lines connecting their centers with the center or axis of pivot 39 would form a little more than a right angle with a line connecting the centers of said rollers and the axis of pivot 40. In other words, the central lines of slots 46, 46' are tangent to a circle described by the centers of rollers 44, 44' in moving about pivot 39. It will be seen that rollers 44, 44' act alternately on cam plate 38. That is, when one roller moves into engagement with its respective slot in the cam plate 38 the other of said rollers moves out of engagement with said plate. It is also obvious that from the central position of the parts 37, 38, which are the positions occupied by said parts during movement of the vehicle in a straight line, the initial movement of cam plate 38 with respect to the movement of double cam 37 either way is very slow owing to the tangential direction of slots 46, 46' with respect to circle described by rollers 44, 44'. This movement can be varied from zero to any degree, by placing the centers of rollers, 44, 44', more or less in advance of tangential position, also by varying direction of slots 46, 46' or by making them curved instead of straight.

Owing to the relation of parts 37, 38 above described it will be seen that cam plate 38 has little or no power to move the cam 37 when the parts are in their normal positions and this inability is augmented and increased by the large diameter of pivot 39, so that rollers 44, 44' must advance some distance in slots 46, 46' before cam plate 38 can overcome the friction of said pivot. In operating the steering device power applied to the steering lever has such a great leverage on the pivot 39 that the friction thereof does not perceptibly impede the operation. When, however, power is applied through the rods 34, 34', and cam plate 38, to reverse their movement, the friction of pivot 39 has such a great leverage on the power that it is absorbed and neutralized, and as the power applied to rods 34, 34' is increased the friction on pivot 39 is proportionately increased, because such power acts to directly force the pivot 39 against its seat, making a positive dead lock, when operating in said central position. It is obvious therefore that any force acting on cam plate 38 through rods 34, 34' and steering knuckles, such as the steering wheels striking obstructions, ruts, etc., will have no effect to turn double cam 37 and therefore the steering mechanism is practically automatically locked when the vehicle is moving in approximately a straight line. When turning curves and the like, the driver's attention is fixed, and the grip on steering lever firm, and locking further than this is not desired.

Double cam 37 is rotated back and forth to operate the steering knuckles by a vertical shaft 49, which is connected at its lower end to the ball 39 forming the pivotal mounting of the cam 37. To accommodate the lateral sway of the body of the vehicle into which the upper end of the shaft 49 extends, and the vertical twisting of front axle 10, consequent from running over uneven ground, the shaft 49 has the above described ball and socket joint 39 with casing 36, which permits the shaft to swing laterally. The cross plates of the cam 37 between which the rollers 44, 44' are mounted are farther apart and said rollers are longer than is required to allow cam plate 38 to pass through, which permits said cam 37 to rock vertically with ball 39, and shaft 49, rollers 44, 44', sliding through slots 46, 46'. Double cam 37, however, can have a permanent bearing in casing 36, and shaft 49 be flexibly jointed to it. An oblong box 50, extending up from casing 36, is provided with a bearing 50' in which the shaft 49 turns, this bearing being slidable laterally in the upper end of the box 50, and fitting the front and rear walls of the box so as to prevent the shaft 49 from swinging forward and backward with respect to the axle 10. The upper end of the shaft 49 has an extension, which will be presently described, and this extension has a bearing in the vehicle body and therefore prevents the axle 10 from turning about its own axis, or, in other words, maintains the shaft 49 in an upright position. The casing 36, can, however, have a rear extension connected to a cross-bar between the reaches to prevent the axle 10, from turning and in such construction the oblong box 50, would be dispensed with. To accommodate the vertical play of body with respect to axle 10, shaft 49 is made extensible, one portion 51 being tubular, the other 52 sliding into, or "telescoping" with it, said parts being prevented from rotating with respect to each other, by slots and pins or feathers. (See Figs. 5 and 6). The vertical play of the body is constant and if there were only one or two pins or feathers, as is the custom in constructing extensible shafts, they would quickly wear, and cause much lost motion. To overcome this difficulty I form teeth entirely around the member 52 like "pinion wire" and on the inside of tube 51 form a corresponding number of teeth to engage those of the member 52, said teeth being of considerable length. That is, in the embodiment of my invention herein illustrated the member 52 has 16 teeth each one-eighth inch deep, and the member 51 has teeth six inches long, so there are always in contact twelve square inches of wearing surface, notwithstanding the restricted space. This makes the steering shaft, as regards rotation, practically a solid shaft, and in regard to wear practically indestructible. A light metal tube 53 attached to the upper end of the member 52 has a close sliding fit on member 51 and excludes dust.

The upper end of the shaft 49 has a ball and socket connection 55 (Fig. 2) with the foot plate 56 of the body of the vehicle. As hereinbefore stated, I preferably place this shaft and casing 36 at a point midway of the length of the axle in order to give a more symmetrical appearance, but it is generally preferred to have the steering lever 57 placed to the right of the center. I preferably make connections for this effect by means of two parallel links 58, 58', Figs. 2 and 2ᵇ, connecting the diametrically opposite arms 59, 59' and 60, 60', respectively on shaft 49, and steering lever 57. It is not desirable to swing the steering lever more than 60° or 70°, while double cam 37 swings 130°. I accomplish this by making arms 60, 60', on the steering lever correspondingly longer than arms 59, 59', on the shaft 49. It will be observed that this link connection removes all thrust from the bearings of the lever 57 and shaft 49 in the vehicle body and practically doubles the length of arms 59, 60, largely eliminating wear and lost motion.

My present invention is specially adapted for use in connection with the driving mechanism shown in my Patent No. 654,716, dated July 31, 1900. Referring to that patent it will be seen that the steering lever, besides its function of turning the front wheels to guide the machine by a lateral swing in a horizontal plane, like the tiller of a boat, serves also to control the speed of, stop, or reverse the motor, etc., by a back and forward swing in a vertical plane. This double function is accomplished in the present instance by providing a mounting of peculiar construction for the steering lever. This lever 57, as shown in Figs. 2, 2ᵃ and 2ᵇ, is journaled in two bearings 62, 62' on opposite sides of a ring 63, which has two diametrically opposite trunnions 64, 64', the axes of which extend at right angles to the center line of the bearings 62, 62'. These trunnions have bearings in a piece 65 firmly secured to the foot plate 56 of the vehicle body. A link 66 extending down from the ring 63 connects the steering lever with a rod 67, leading to the motor controlling mechanism 68. A universal joint 69 arranged between the bearings 62, 62', and concentric with trunnions 64, 64', and said bearings connect and communicate the rotary motion of lever 57 to arms 60, 60', which are kept horizontal by their hub 70, revolving between guides 71, on plate 65. In this manner steering lever 57 is free to swing back and forward in a vertical plane, while its rotary motion is communicated to arms 60, 60' and the two functions do not interfere with each other.

It is desirable to have the arm by which the movements of the steering lever are controlled extensible and especially so in this case where it has considerable motion to and from the operator. Referring particularly to Figs. 1, 7, 8 and 9, it will be seen that I accomplish this end by constructing the arm in two parts, part 72 being a tube which is connected to the lever 57 and having, preferably, a series of ring teeth 73 on its inner surface like rack teeth. For convenience in construction these teeth 73 may be spirally formed as shown. Said teeth are cut away at 74, forming one or more slots or grooves. The other part 75 of the steering arm has corresponding threads 76 formed about its inner end, which extends into said tubular member 72. The threaded end of the part 75 is so grooved that the remaining portions of the thread form longitudinally-extending ribs which can, when properly adjusted, slide freely in the slots 74, and when the parts 72, 75, are adjusted to bring the ribs 76 in alinement with the slots 74, the part 75 slides or telescopes in and out of part 72, and when turned in either direction said parts are locked together at any longitudinal adjustment. The part 75 of the steering arm may be hollow and within a chamber formed at the inner end thereof, is provided with a plug 77 having feathers fitting into the slots 74, and permitting the plug to slide freely longitudinally of the part 72 but preventing it from rotating in the tube 72. The plug is rotatably mounted in the part 75 and coiled spring 78 connects the two and acts to turn part 75 back to its normal position of engagement with the tubular part 72 when released after being unlocked by rotating it in said part 72. That is, when the operator's hand is removed from handle 79 it, through the part 75, is locked to part 72 automatically. Preferably I make handle 79 in the form of a short cylinder extending at right angles to the part 75 of the steering arm. The end of 75 is flattened and attached to handle 79 at its center, the flattened portion 80 passing between the first or second and third fingers when grasping the handle. This makes a very light, and neat appearing handle and one on which a firm and secure grip of the hand can be had. Preferably I arrange it so that its normal position is horizontal and by turning it into perpendicular position it disengages the parts 75, 72. It will be observed that this steering arm has the important advantage that it can be shortened or lengthened without disturbing the grip of the steering hand or interfering with its function of steering, and does not require the use of the operator's other hand to loosen or fasten any part.

It will be seen that besides minor advantages, there are two very important ones gained by this improved steering mechanism. 1st. A very sensitive movement for all maneuvering required in straight forward running, the steering arm having a considerable swing for a slight movement of the wheels, and increasing rapidly toward extreme movement, enabling the operator to handle the machine with extreme delicacy and precision at very high speed. At the same time the general or complete movement is very prompt and quick. 2nd. Automatically locking for all maneuvering required in straight forward running, making it safe to remove the hand from the steering arm at such times.

Having thus described my invention, what I claim is:

1. In a motor vehicle, the combination with an axle, steering wheels supported at the ends of the axle, and means for adjusting said wheels, of a shaft mounted in suitable bearings having movement relatively to the axle and vehicle body, said shaft being connected with said adjusting means and adapted to accommodate both the lateral movement of the body and vertical motion of the axle.

2. In a motor vehicle, the combination of an axle, steering wheels supported at the ends of the axle, adjusting devices extending inwardly from said wheels, and vertically arranged actuating shaft connected to said devices, said shaft consisting of two telescoping members one of which is mounted in a bearing having movement on the vehicle body and the other of which is mounted in a bearing having movement relatively to the axle.

3. In a motor vehicle, the combination with an axle, steering wheels mounted at the ends of the axles, a vertical actuating shaft having its ends mounted in bearings movable relatively to the axle and vehicle body, respectively, said shaft consisting of two freely telescoping sections, one having a plurality of longitudinal ribs and the other a corresponding series of longitudinally extending grooves into which the ribs on the first said member extend, connections between the lower end of the said shaft and the steering wheels, and a steering lever connected with said shaft.

4. In a motor vehicle, the combination of an axle, steering wheels mounted at the ends of the axle, devices for adjusting said steering wheels to control the direction of movement of the vehicle, a steering lever, and a shaft between and connected to both said wheel adjusting devices and the steering lever, said shaft being connected to both the running gear and vehicle body by ball and socket joints.

5. In a motor vehicle, the combination with steering wheels, adjusting devices therefor mounted on the running gear of the vehicle, a steering lever mounted in the body of the vehicle, a shaft arranged between and connected to both said steering lever and wheel adjusting devices, and consisting of two freely telescoping parts, and a sleeve arranged about the telescopic connection between said shaft members to exclude dust from said joint.

6. In a motor vehicle, the combination with motor mechanism for propelling the vehicle and devices for steering the same, of a ring-like support having diametrically opposite trunnions mounted in bearings on the vehicle to rock about a horizontal axis, a lever connected with said ring-like support by a universal joint, whereby it is adapted to rotate about a vertical axis independent of its movement with said support about a horizontal support, connections between said lever and the steering devices, and an arm connected to said support opposite the lever and connected to the devices for controlling the motor mechanism.

7. In a motor vehicle, the combination with motor mechanism for propelling the vehicle, and devices for steering the vehicle, of a ring-like support having diametrically opposite horizontal trunnions mounted in bearings on the vehicle body, a lever extending through a vertically arranged guide and into alined socket on said support between said trunnions and adapted to be rotated about a vertical axis independent of its movement with said support, connections between the lever and steering devices, and connections between the lever support and the motor controlling devices.

8. In a motor vehicle, the combination with a steering lever, of an arm connected with said lever consisting of two telescopically connected sections, one of said sections having a series of threads formed therein and having a longitudinally extending groove intersecting said threads, and the other section having a tongue or lug adapted to normally engage a thread on the first said section to lock said parts together and adapted to be adjusted into alinement with said longitudinal groove in the first said member to permit the sections to be adjusted relatively to each other to vary the length of the steering arm.

9. In a motor vehicle, the combination with a steering lever, of an arm having a relatively stationary section connected with said lever, and provided with an internally threaded socket at its inner end, the threads in said socket being interrupted by a longitudinally extending groove extending into said socket and rotatable axially therein, said handle section having a radial projection adapted to alternately engage with the thread of the socket member or aline with the longitudinal groove therein as said handle member is rotated, and a spring for normally maintaining said projection in engagement with said thread.

10. In a motor vehicle, the combination with a steering lever, of an arm consisting of two telescoping sections, one of which is connected to said lever, said sections being provided with mutually engaging means adapted to lock said sections together at different points to vary the length of the arm and adapted to be disengaged by rotating one of the sections.

11. In a motor vehicle, the combination with a steering lever, of an arm having a member connected to the steering lever and provided with an internally threaded socket, the thread in said socket being interrupted by a longitudinally extending groove, a handle member having one end extending into said socket and provided with a lug adapted to engage the thread therein, a supplemental lug pivotally connected to said handle member and extending into said groove in the socket member, and a coiled spring connecting said supplemental lug and said handle member.

12. In a motor vehicle, the combination with a steering lever, of an arm connected at one end to said lever and having at its other end a transverse cylindrical handle, the body of said arm immediately in front of said handle being reduced in width to provide a thin portion which extends between the fingers of the operator's hand when grasping the handle.

13. In a motor vehicle, the combination of a steering shaft, a pair of oppositely-projecting arms thereon, devices connecting said shaft with the steering wheels, a steering lever, a universal joint connecting said lever with the vehicle body, a pair of oppositely-projecting arms upon said lever, and links connecting the arms upon the shaft with the arms upon the lever.

In testimony whereof, I affix my signature in presence of two witnesses.

EDWARD P. COWLES.

Witnesses:
A. B. CHENEY,
H. M. B......

It is hereby certified that in Letters Patent No. 1,166,440, granted January 4, 1916, upon the application of Edward P. Cowles, of Sparta, Michigan, for an improvement in "Motor-Vehicles," an error appears in the printed specification requiring correction as follows: Page 3, line 101, after the word "first" insert the words *and second;* and that the said Letters Patent should be read with this correction therein that the same may conform to the record of the case in the Patent Office.

Signed and sealed this 1st day of February, A. D., 1916.

[SEAL.]

J. T. NEWTON,

*Acting Commissioner of Patents.*

Cl. 21—90